US010023791B1

(12) United States Patent
Corcoran et al.

(10) Patent No.: US 10,023,791 B1
(45) Date of Patent: Jul. 17, 2018

(54) SYSTEM AND METHOD OF COATING A PROPPANT

(71) Applicant: Unimin Corporation, New Canaan, CT (US)

(72) Inventors: Daniel Corcoran, Wilmington, NC (US); Jeffery S. Hicks, Asheville, NC (US); Phil Maupin, Brentwood, TN (US)

(73) Assignee: Covia Holdings Corporation, Independence, OH (US)

( * ) Notice: Subject to any disclaimer, the term of this patent is extended or adjusted under 35 U.S.C. 154(b) by 0 days.

(21) Appl. No.: 15/232,912

(22) Filed: Aug. 10, 2016

Related U.S. Application Data

(60) Provisional application No. 62/206,524, filed on Aug. 18, 2015.

(51) Int. Cl.
| | | |
|---|---|---|
| *C09K 8/80* | (2006.01) |
| *B01J 2/00* | (2006.01) |
| *B05D 1/02* | (2006.01) |
| *B65G 3/04* | (2006.01) |
| *B65G 65/40* | (2006.01) |
| *B65G 69/18* | (2006.01) |

(52) U.S. Cl.
CPC ............. *C09K 8/805* (2013.01); *B01J 2/006* (2013.01); *B05D 1/02* (2013.01); *B65G 3/04* (2013.01); *B65G 65/40* (2013.01); *B65G 69/188* (2013.01)

(58) Field of Classification Search
CPC . C09K 8/805; B01J 2/006; B65G 3/04; B65G 65/40

USPC .......................................................... 427/212
See application file for complete search history.

(56) References Cited

U.S. PATENT DOCUMENTS

| | | | | |
|---|---|---|---|---|
| 3,822,866 A * | 7/1974 | Daester | ............... | B01F 15/0445 366/8 |
| 3,949,908 A * | 4/1976 | Baillie | ................... | B01J 8/0015 239/655 |
| 4,572,378 A * | 2/1986 | Douglas | ................... | B07B 13/00 209/637 |
| 5,846,022 A * | 12/1998 | Grundl | ..................... | E01C 19/48 404/101 |
| 6,190,105 B1 * | 2/2001 | Zey | ........................ | B65D 88/66 414/306 |
| 9,637,671 B2 * | 5/2017 | Bestaoui-Spurr | ........ | C09K 3/22 |
| 2007/0209583 A1 * | 9/2007 | Garner | ..................... | B01J 2/006 118/303 |
| 2008/0128528 A1 * | 6/2008 | Alongi | ................ | A01M 7/0089 239/8 |
| 2013/0192835 A1 | 8/2013 | Vorderbruggen et al. | | |
| 2015/0119301 A1 * | 4/2015 | McDaniel | .............. | C09K 8/805 507/224 |

(Continued)

*Primary Examiner* — Terrell H Matthews
(74) *Attorney, Agent, or Firm* — Rankin, Hill & Clark LLP

(57) ABSTRACT

A system for adding dust control solution to a vertically falling first stream of a substantially dry particulate proppant, where the first stream has effective diameter, the system including a stationary, generally horizontal, deflector plate with drop-off edge, the plate mounted into the stream whereby the proppant collides with the plate and cascades from the plate around the drop-off edge to create a second stream of the particulate proppant having the general shape of the drop-off edge with a stream thickness and nozzles for spraying dust control solution into the second stream.

8 Claims, 9 Drawing Sheets

(56) References Cited

U.S. PATENT DOCUMENTS

Figure 1:
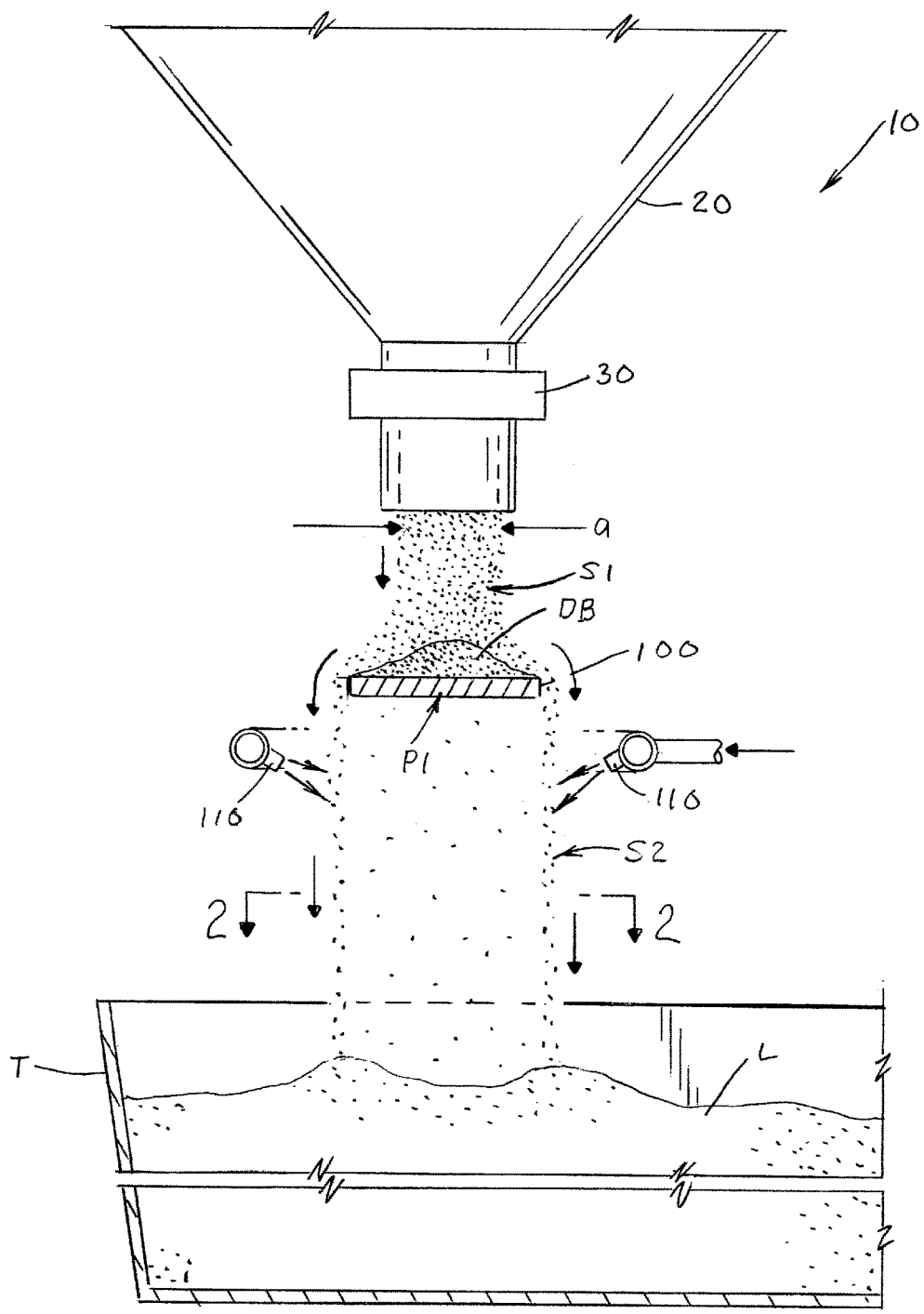

2016/0024360 A1* 1/2016 Bestaoui-Spurr ........ C09K 3/22
427/221

* cited by examiner $b < 6" < 3"$ $a/b > 5$

SYSTEM AND METHOD OF COATING A PROPPANT

This application claims priority to provisional patent application Ser. No. 62/206,524 filed on Aug. 18, 2015 which is incorporated by reference herein.

The present invention relates to the art of coating a sand-like particulate or granular material previously processed into a proppant as used for hydraulic fracturing with a dust control solution and more particular to an improved system and method to decrease the cost and increase the efficiency of providing a generally dust free proppant at the fracturing site.

For many years the proppant industry has expended tremendous time and effort in research and development in an effort to provide a dust free proppant for hydraulic fracturing. The reasons for controlling the dust coming from a proppant, like frac sand, are well known in the fracking art. Some companies have directed attention to improving the solution, as disclosed in Vorderbruggen US 2013/0192835, incorporated by reference herein. In accordance with well-known techniques, the "new" solution developed by Baker Hughes was "sprayed" onto the granular proppant. Other companies have attempted to develop mechanisms for improving the various coating practices, such as the practice of spraying a proppant with a dust control liquid or solution. One such attempt is disclosed in McDaniels US 2015/0119301, incorporated by reference herein. Although these disclosures describe prior efforts to process dust free proppants, they do not technically provide background for the present invention, which invention is a different approach to providing dust free proppant at the hydraulic fracturing site, even though it does use as one operation a "spray" coating technique. However, preparing the proppant for spray coating in a primary aspect of the invention.

The major advance in the art of the present invention is that the novel mechanical equipment to provide the proppant for the normal, free fall spraying is essentially maintenance free. The equipment has a long life during routine processing of the proppant. Consequently, the system and method of the present invention operates for long times at low cost and experiences only rare downtimes, even when repeatedly loading tons of proppant. In practice, the new system and method is actually part of the proppant loading equipment employed at the supply source of the proppant. The new system and method reduces the time between dust coating and use of the proppant at the fracturing site, which delay time is critical in the proppant industry.

SUMMARY STATEMENT

Unimin has developed a system for loading frac sand into a transport vessel, like a truck, for immediate delivery to a hydraulic fracturing site. A stream of frac sand is discharged downwardly in a full, or first, stream of densely packed proppant particles. This first stream has a closed shape with an effective diameter. To allow on-site spraying of a dust control liquid into the downwardly moving, first stream, Unimin mounts a fixed deflector plate, so the first stream collides with the deflector plate and cascades over the edge or edges of the plate in a thin, second stream of finely dispersed particles with an opened shape defined by a small effective transverse thickness. Unimin spray coats the thin, second stream, either a closed circle or a lineal layer, whereby the second stream increases the coating efficiency as the individual particles fall into the transport vessel. Consequently, the coating procedure does not delay immediate shipment of the frac sand to the hydraulic fracturing site. In the preferred embodiment the effective transverse thickness of the second stream is substantially less than six inches, preferably less than three inches and/or the thickness of the second stream is substantially less than ⅕ of the effective diameter of the first stream.

STATEMENTS OF INVENTION

The invention is, a system for loading a mass of essentially dry sand-like particulate or granular processed material with a D99 particle size in the range of 50-2000 microns, preferable a proppant and more preferably a silica sand product conforming to API standard sizes for the hydraulic fracturing sands, i.e. about 300-1,200 microns into a transport vessel. This new system comprises a mechanized discharge or loading device for the particulate material, wherein the discharge device receives a supply of the particulate material and creates a vertically downward, unrestrained, particle full, or particle dense, first stream of free falling particulate material. This first stream has an "effective diameter" and extends from an upper location as it moves downwardly in a given, gravity controlled path. A fixed generally flat, primarily horizontal deflector plate, with a peripheral drop-off edge having a selected shape larger than the effective diameter of the particulate material, is mounted in a position to intersect the given path so the falling particulate material in the first stream drops onto the deflector plate, forms a sand dead bed and then flows or cascades downwardly from around the peripheral drop-off edge. The intercepting action of the deflector plate converts the full first stream of the falling particulate material into downwardly, moving transversely expanded particle mass with widely dispersed particles. This second stream of particulate material has a horizontal shape conforming to the shape of the peripheral drop-off edge of the deflector plate and an effective transverse thickness substantially less than the effective diameter of the first stream. A plurality of nozzles located below the deflector plate and generally facing the second stream spray a dust control solution onto the material moving in the second stream. In this manner, the second stream constitutes a moving particle mass with an increased coating efficiency over the low coating efficiency of the full first stream because the particle density is drastically decreased. A transport vessel is located below the second stream for receiving the dust control treated particulate material for shipment to the use site.

A system as defined above includes a device for controlling the volume of dust control solution to the volume of particulate material passing by the nozzles so the moisture content of the dust control treated particulate material in the transport vessel is less than about 3 percent and preferably less than about 2 percent, a more preferably less than about 1 percent and even more preferably less than 0.3 percent. And, it has been found, that the particle size of the proppant can impact the amount of moisture that is allowable without unwanted agglomeration. Larger particle size proppants can have more moisture without such adverse agglomeration.

A system as defined above where the fixed deflector plate is essentially horizontal and the peripheral drop-off edge has an horizontal shape that is curvilinear and surrounds the deflector plate so the second stream is curvilinear with a generally particle free center volume. The curvilinear shape is generally circular and may be formed into a cone by a loading spout. Preferably, the nozzles are in the center volume of the second stream and are spaced around the shape of the second stream. However, the nozzles can be outside the horizontal shape of the second stream and are spaced around the shape of the second stream.

The deflector plate creates a dead bed to protect the plate. In the invention, the plate is spaced from the upper location of the full, first stream in the range of 6-24 inches or preferably greater than twelve inches.

In one modification, additional nozzles can spray the first stream before it collides with the deflector plate. Consequently, dust control solution is added to the original stream and then into the diverse particles of the second stream created by the novel deflector plate.

In some cases the fixed deflector plate that spreads out the falling particles is movable into different fixed horizontal positions to change the dispersion position created by the plate.

In the preferred embodiment, the transport vessel is a truck capable of immediate delivery of the treated particulate material to a hydraulic fracturing site, but other vessels can be used. Indeed, the final mass may be stored a short time.

Preferably, the discharge device is a storage silo with or without an adjustable valve to control the volume of particulate material in the full, first stream. In an alternative embodiment, the discharge device is a transloader with or without an adjustable belt speed to control the volume of the full, first stream.

When the discharge device is a storage silo, it may include an adjustable, preferably rectangular valve movable to control the volume of the full, first stream and the fixed deflector plate intersecting the first stream is a generally rectangular plate with a front and two sides. The selected shape is formed by three generally straight lines forming the peripheral drop-off edge of the deflector plate. The deflector plate is moveable horizontally below the rectangular valve into different fixed positions.

When the invention is used with a transloader, the deflector plate is normally mounted on a fixed vertical wall extending between the first and second streams, but outside the paths of the two streams. The vertical wall is generally flat and the peripheral drop-off edge of the deflector plate is a shape extending from the wall, around the deflector plate and back to the wall. The "extending" shape is formed by three generally straight lines. Preferably, the vertical wall is part of a delivery shoot of a transloader.

In the invention, the fixed deflector plate has a horizontal area defined by the peripheral drop-off edge substantially greater than the transverse area of the first stream, preferably at least twice as great.

A method performed by each of the systems defined in the above is another aspect of the invention and other treatment solutions can use the methods employing this new technology.

In summary, the invention is a system or method comprising a particle full, first stream of free falling particulate material where the cross-section of the stream is a closed peripheral shape having an "effective" diameter surrounding a generally uniform and dense distribution of the particulate material and conversion of the first stream into a second stream having generally a thin shape, such as a circle or layer, wherein the thin shape is a drastically less dense flow of particles and has a given transverse thickness. Such given thickness has a selected value drastically less than the effective diameter of the first stream. Preferably, the effective diameter of the first stream is at least five times the effective thickness of the second stream. The transverse thickness of the second stream is less than six inches and preferably less than three inches. Preferably, the area of the deflector plate is at least twice the transverse area of the first particle dense stream.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 1 is a layout drawing of the preferred embodiment of the invention;

FIG. 2 is an enlarged cross-sectional view along line 2-2 of FIG. 1;

FIG. 3 is a listing of the preferred parameters of the invention;

FIG. 4 is a layout drawing of a second embodiment of the invention;

FIG. 5 is a cross-sectional view taken generally along line 5-5 of FIG. 4;

FIG. 6 is a cross-sectional view taken generally along line 6-6 of FIG. 4;

FIG. 7 is a more detailed layout drawing of the embodiment shown in FIGS. 4-6;

FIG. 8 is a cross sectional view of the embodiment shown in FIG. 7 as it is in operation with proppant moving to truck T;

FIG. 9 is a layout drawing of a transloader modified to incorporating the invention for loader truck T;

FIG. 10 is a layout drawing of a second embodiment of a transloader modified to incorporate the invention for loading truck T;

FIG. 11 is a general cross-sectional view of the incoming particle stream S1 and to modified particle stream S2 converted for efficient spray coating of the particles;

FIG. 12 is a vertically downward pictorial view of a dead bed with dimensions illustrating the invention; and FIG. 13 is a side view illustrating a dead bed for protecting the intercepting plate used in the invention.

DESCRIPTION OF PREFERRED EMBODIMENTS

The present invention relates to the concept of a system or method for loading a mass of essentially dry, sand-like particulate or granular processed material having controlled maximum particle size into a transport vehicle, such as a truck. This new system and method is primarily used to ship a proppant, such as frac sand, which is dust control coated to the site of a hydraulic fracking operation. As is well known, to produce a dust-free proppant, a solution is sprayed onto the proppant at the manufacturing site and the proppant is then shipped to the fracking site. One of the limitations of this process is that the dust control solution sprayed onto the proppant has a very short life of high effectiveness. Therefore, it is necessary to get the treated frac sand or proppant to the site expeditiously. To accomplish this one advantage, the new system and method not only facilitates efficient coating of the proppant, or frac sand, but also does the operation in combination with the normal equipment that loads the proppant or sand into the transport vessel. Such vessel is usually a truck, but it could be another type of transport vehicle. The details of the invention are set forth in the statements provided in the previous description and the attached drawings are used to illustrate how these statements of invention are accomplished in practice.

Figures 2, 3:
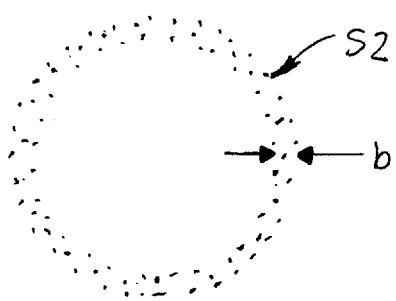

The preferred embodiment of the invention is schematically illustrated in FIGS. 1 and 2 as system 10. A supply silo 20 at the manufacturing facility for the proppant accepts the processed proppant for storage and subsequent transportation to the site for use. In system 10, silo 20 has an outlet valve 30, which is normally adjustable and is often rectangular, but could be circular. Valve 30 releases stream S1 of proppant, which stream is densely packed into the continuous mass of proppant particles. Such densed particle mass is not easily penetrated. Stream S1 has an effective diameter a, which diameter term is used in the fashion of particle shape description, meaning the shape could be rectangular, circular, or otherwise. The effective diameter is an assumed dimension for defining the cross-section. Indeed, "effective diameter" also means the general thickness of stream S1, such as the width of a square stream. This dense concentration of proppant, which has a D99 particle size, about 300-1,200 microns, drops downwardly by the force of gravity against the structure comprising the novel aspect of the present invention. This novel aspect is deflector plate P1 having a drop-off edge 100, which edge is normally circular in this embodiment, but could be of any generally rectangular or square to circular shape. After stream S1 collides downwardly with plate P1, the proppant particles cascade over edge 100 to form second stream S2, which is loose flow of spaced particles that allows access to the various particles from the outside because the stream has been diffused by deflector plate P1. The shape of stream S2 is shown in FIG. 2. The transverse dimension of the thin circular stream S2 is identified as b. In accordance with the invention, b is less than 6 inches; however, it is very much preferred that it be less than about 3 inches so it can be penetrated. Furthermore, as illustrated in FIG. 3, the effective diameter a of stream S1 is drastically larger than thickness b. In the preferred uses, as so far developed, the effective diameter a is at least five times the relatively thin thickness b of stream S2. As the stream S2 moves downwardly from drop-off edge 100 of plate P1, a series of nozzles 110 surrounding stream S2 sprays a dust control solution onto the downwardly falling particles. These particles are efficiently coated since the nozzles can penetrate the loose mass of particles in stream S2. Thickness b is controlled so the sprayed solution penetrates a distance to coat the falling particles of proppant in the stream. Further efficiency is possible by incorporating a series of spray nozzles internal of stream S2 in a manner which will be described with respect to FIGS. 4 and 5. Coated proppant cascading from edge 100 is collected as load L of proppant in the bed of truck T for transport to the fracking site. By using the present invention, horizontal deflector plate P1 has an area larger than the area of stream S1 to create a sand dead bed on the top of the plate. The dense proppant particles in stream S1 collide with plate P1 and are accumulated on the plate so that there is no direct contact of the relatively hard particles in stream S1 with the plate. This sand dead bed action protects the plate for long term use and is a distinct advantage of the new development using plate P1 to disbursed dense stream S1 into a generally dispersed particle stream S2 for spray coating either from the outside, from the inside, or from both the outside and the inside.

Figure 4:
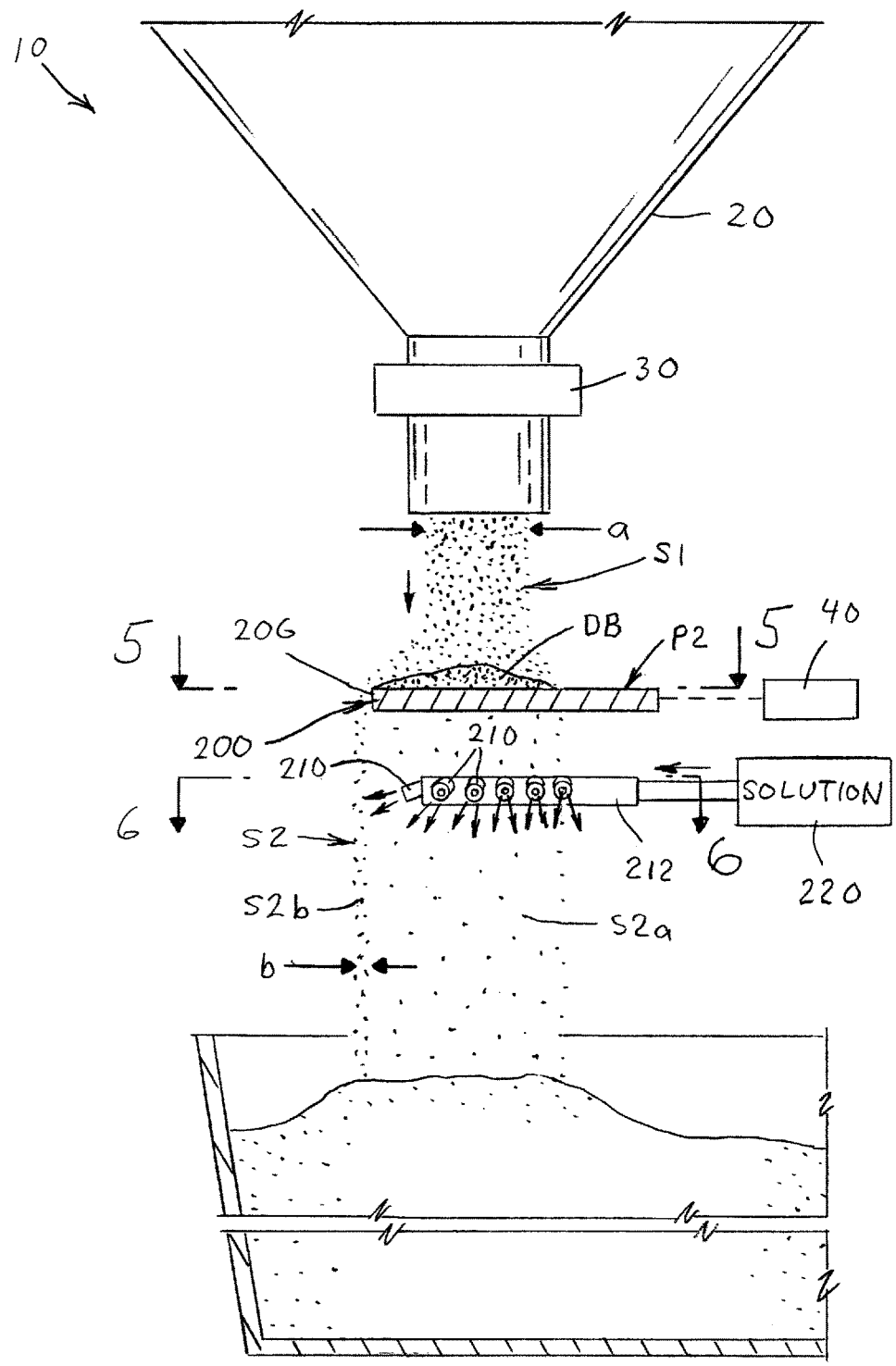
Figure 5:
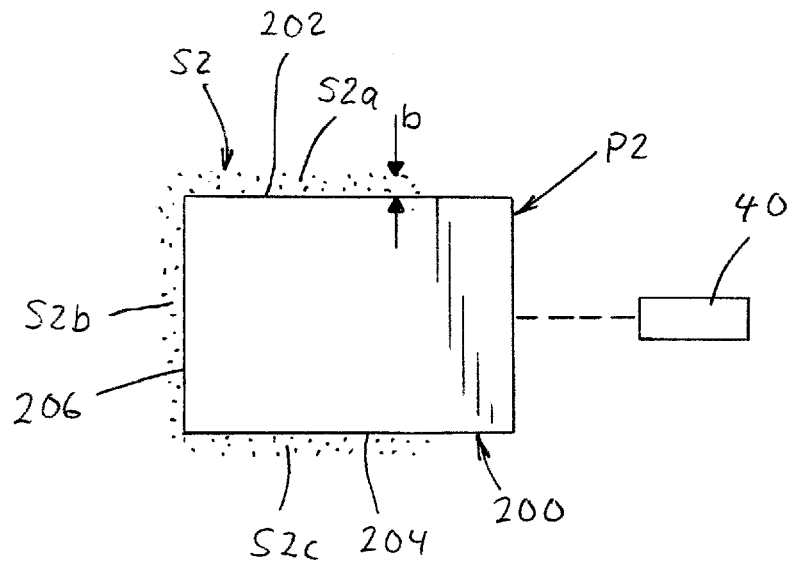
Figure 6:
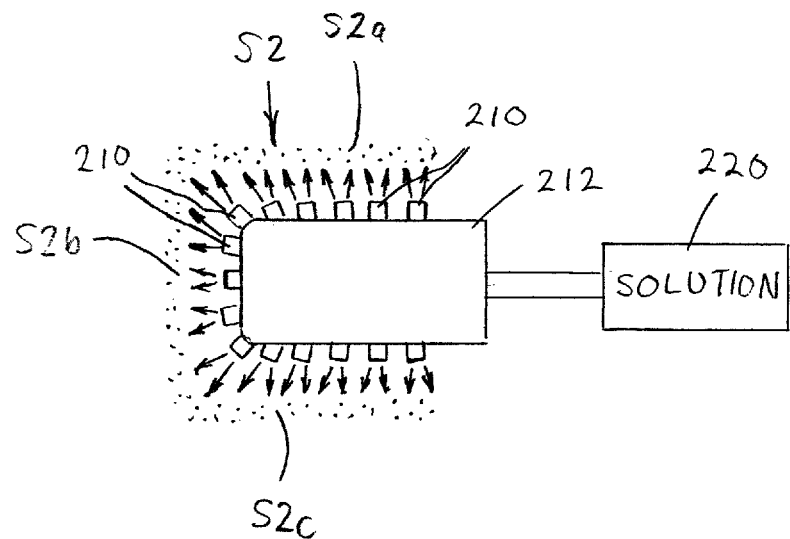

Referring now to FIGS. 4-6, another version of system 10 is illustrated wherein silo 20 directs stream S1 downward from valve 30 to collide with fixed deflector plate P2 movable into different positions by appropriate mechanism 40. Plate P2 has drop-off edge 200 which is rectangular in shape and utilizes only sides 202, 204 and front edge 206 as particle control areas, as illustrated in FIG. 5. Rectangular, fixed, but adjustable horizontal plate P2 creates a generally U-shaped stream S2 having a first side S2a, a front side S2b, and a side S2c generally parallel to side S2a. Of course, plate P2 could be positioned so S1 comes off all four sides of the plate. In accordance with the illustrated embodiment of the invention in FIGS. 4-6, the effective diameter a is still the same as shown in FIG. 1. Indeed, thickness b is the same as thickness b of circular stream S2, as shown in FIG. 2. A plurality of nozzles 210, as shown in FIGS. 4 and 6, are provided with dust control solution from pressurized supply 220 by way of manifold 212. The spray application system or manifold 212 is paired with a chemical batching system or supply 220 to provide the dust control solution to the illustrated spray system 212 at the required pressure. The batching and spray systems are designed to use air over liquid pressure pot or various pumps to pressurize the solution. A central batching system plumbs solution to the manifold of one or more silos to allow the distribution of solution to any number of silos with an individual manifold 212, only one silo is shown. Design of manifold 212 allows for ease of future expansion to a plurality of silos using method 10. The batching system 220 has a dilution component to allow a concentrated chemical solution to the diluted and thoroughly mixed prior to delivery to a manifold 212. The batching system and delivery system are PLC controlled and programmed for ease of use. In practice, the batching system, shown as supply 220, includes a manual override of the PLC functions to accommodate non-routing chemical treatment of the incoming proppant and require changes in the process. Arrangement of the nozzles can be adjusted as discussed with respect to FIG. 1. Indeed, nozzles can be on the inside of the downwardly falling stream S2, or on the outside, or both sides. Again, stream S1 collides with the top of plate P2 to create a sand dead bed protecting the plate from erosion or wear due to the action of the proppant being processed. It has been found that plates P1 and P2 last for an extended period of time so that they are not subjected to reoccurring maintenance as is experienced by other devices used to dust coat proppants.

Figure 7:
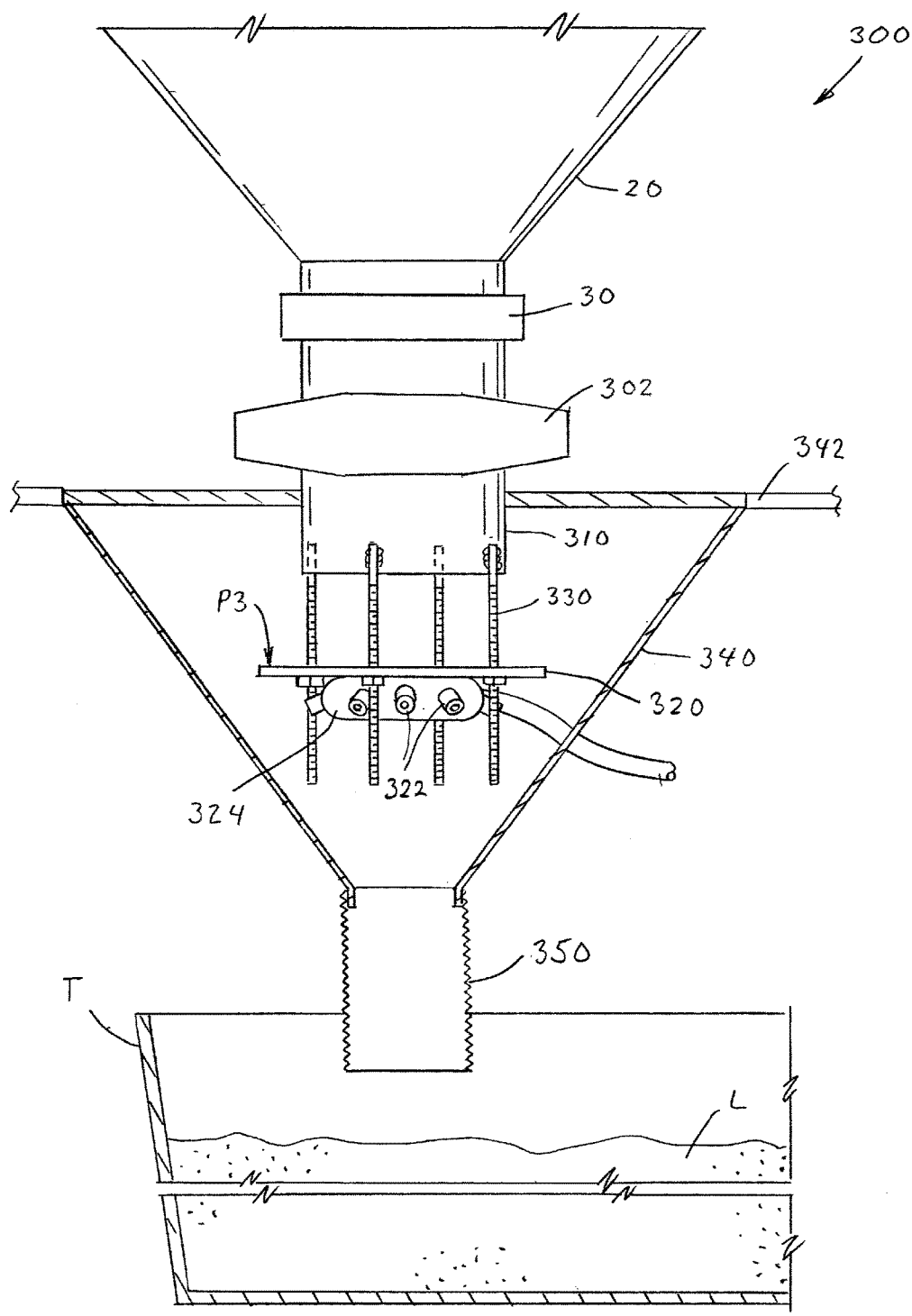
Figure 8:
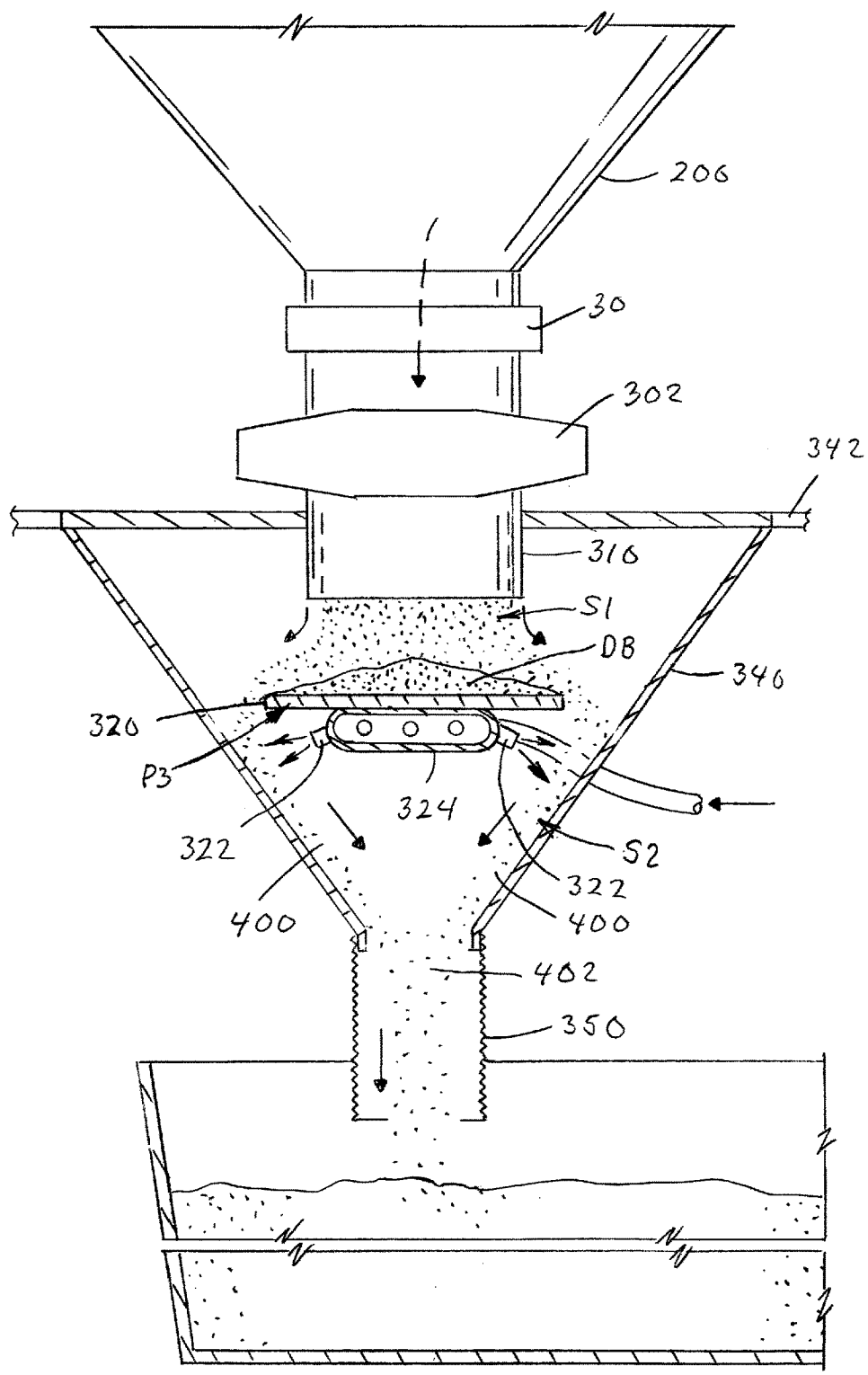

FIGS. 7 and 8 are layout drawings of the system as it is actually implemented at least in test operations. System 300 includes silo 20 with adjustable valve or gate 30 as previously discussed. In this practical implementation of the invention, there is provided a dust collector 302 preceding discharge outlet 310 for creating stream S1. In the practical implementation, circular plate P3 has drop-off edge 320, as previously described. A series of spray nozzles 322 direct dust control solution from manifold 324 onto the inside from the downwardly falling stream S2. The manifold is shown in Attachment 3. Moveable spout 340 is set in place by spout positioner track 342. Downwardly falling stream S2 is formed into a cone shape configuration by spout 340, as illustrated in FIG. 8. Stream S2 as described in FIGS. 1 and 2 is shown as a cone shaped configuration having diverging sides 400 converging at outlet point 402 directly above load outlet spout 350 of silo 20. FIG. 8 illustrates the sand dead bed advantage of the present invention wherein horizontal plate P3 accumulates proppant material, as illustrated by the dead bed DB. Consequently, horizontal deflector plates used in the invention as illustrated in FIGS. 1, 4, and 6 has a long life since the rapidly moving particles do not contact the surface of the deflector plate to cause wear of the plate, as in the prior art.

Figure 9:
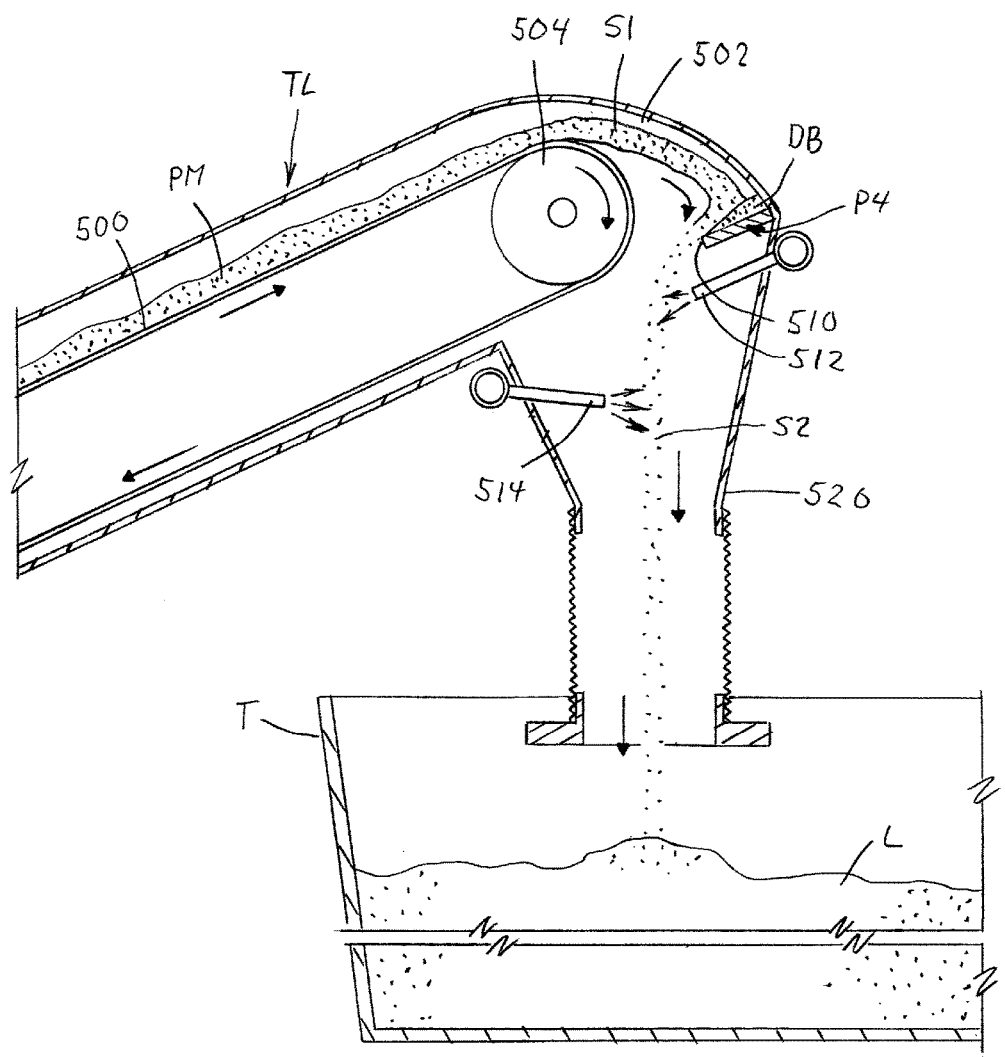
Figure 10:
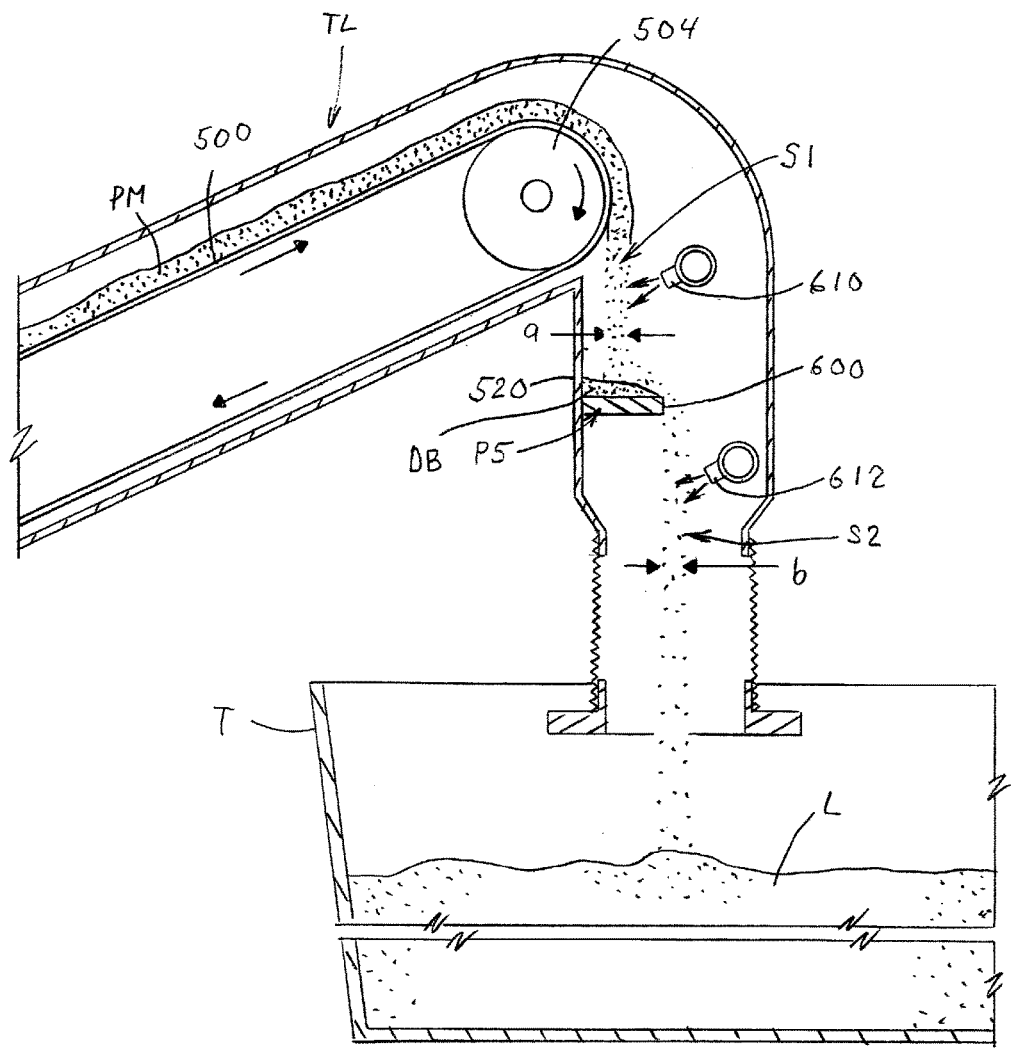

The primary use of the present invention is for a silo loading device as illustrated in FIGS. 1-8; however, the same invention can be used when a transloader TL loads proppant material PM into truck T or other transport vessels, as illustrated in FIG. 9. In this implementation of the present invention, conveyor belt 500 directs proppant material PM into conformed discharge compartment 502 projecting over outer wheel 504 of the loader. Material PM flowing from the belt into compartment 502 is in the form of stream S1 that collides with the upper surface of a somewhat horizontal deflector plate P4 as a dense stream S1 of condensed proppant material particles is directed to the generally horizontal plates in the silo version of the present invention. Plate P4 has an outer drop-off edge 510, which is generally a flat or curved surface, over which stream S2 cascades in the same fashion as previously described. Downwardly falling stream S2 is coated with a dust control solution from vertically spaced groups of nozzles 512, 514. The nozzles create a dust controlled treated stream S2 of proppant for deposit into truck T and available for immediate transportation to the hydraulic fracturing site. A slight modification system for transloader TL as shown in FIG. 9 is illustrated schematically in FIG. 10. In this schematic representation, proppant material propelled or dropped from the outlet of transloader TL flows downwardly in a first stream S1 and collides with generally horizontal plate P5 having an outer edge 600 to create a second particle diverse thin stream at S2. In this illustration, stream S1 is sprayed by a line of nozzles 610 prior to colliding with plate P5. Thereafter, line of nozzles 612 treat the outside of stream S2 cascading over edge 600. Of course, to increase coating a third line of nozzles can be located on the side of stream S2 opposite to nozzles 612. Plate P5 is attached to one side wall of the outlet nozzle 520 as shown in FIG. 9. Stream S1 collides with generally horizontal plate P5 and cascades over edge 600 to form second stream S2, as previously described. In this embodiment, nozzles are employed for both stream S1 and stream S2, which could be used in all implementations of the present invention to increase particle coating.

Figure 11:
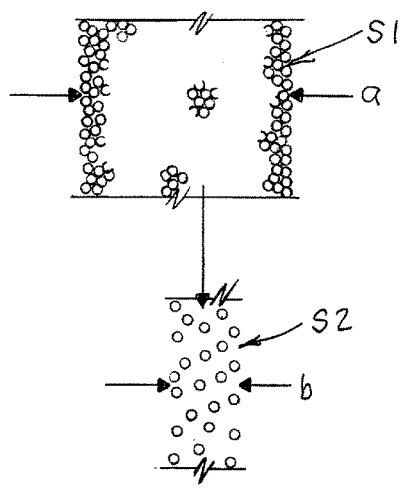

As a point of discussion, FIG. 11 is employed to illustrate the dense characteristics of first stream S1 as compared to the diverse particle distribution or spacing of thin stream S2. Fixed horizontal deflector plates as used in this invention cause conversion of one type of dense particle stream to a second type of diverse particle distribution stream so there is a drastically increased coating efficiency. This new coating process is performed during the actual loading process of proppant material into a transport vessel. In addition to the increased coating efficiency, the sand dead bed of the invention drastically increases the life of the equipment at the loading site so the invention reduces drastically the time between coating of the proppant with the dust control liquid or solution and the time of actual use at the fracking site.

Figure 12:
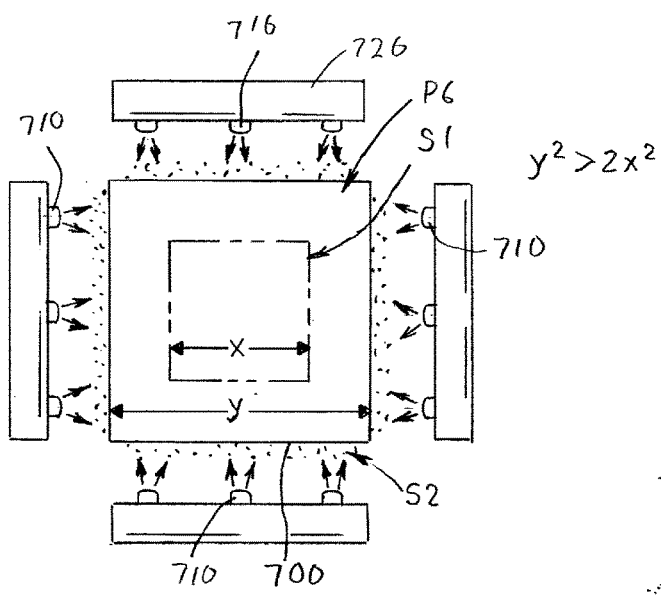
Figure 13:
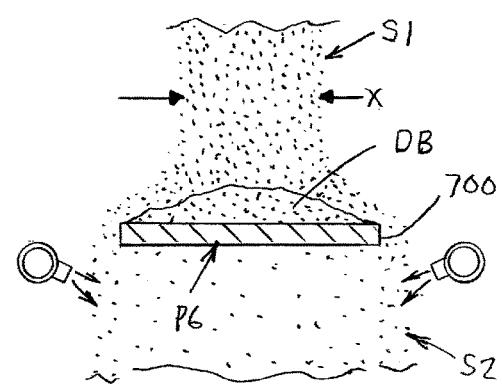

An aspect of the invention is illustrated in FIG. 12 wherein, for schematic purposes, plate P6 is generally square and stream S1 is generally square with a dimension x. Drop-off edge 700 of plate P6 is also a square with a side dimension y. In accordance with a preferred embodiment of the invention, the area of the deflector plate is generally at least twice the area of stream S1. In this schematic illustration, several nozzles 710 are directed to the outside of stream S2 by solution from schematically illustrated manifolds 720, only one of which is shown. A primary improvement of the present invention is a sand dead bed DB created over plate P6 to create a cascading of the proppant material around the edge 700 of plate P6, as shown in FIG. 13. This same action is accomplished in all embodiments of the invention, i.e. the deflector plate captures a created sand dead bed.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation. Further, the attached claims also form part of the specification It is claimed:

1. A system for loading a mass of essentially dry, free flowing dust free proppant particulate material into a transport vessel for immediate transportation to the hydraulic fracturing site for use in a fracturing operation, said system comprises a loading device receiving a supply of said particulate material having a D99 particle size of 50-2000 microns for discharging said particulate material by gravity in a vertical downwardly, unrestrained first stream of free falling particulate material, said first stream having an effective diameter and extending from an upper location downwardly in a gravity controlled given path, a fixed generally flat and generally horizontal deflector plate with a peripheral drop-off edge having a selected shape larger than said effective diameter, said plate mounted in a position to intersect said given path of particulate material so the falling particulate material in said first stream drops onto said deflector plate, forms a plate protecting dead bed of particular material on said plate and then cascades downwardly from around the peripheral drop-off edge creating a second free falling stream of particulate material having horizontal shape conforming to said selected shape of said peripheral drop-off edge and a width where said effective diameter of said first stream as at least 5 times said width of said second stream; a plurality of nozzles located below said deflector plate and generally facing said second stream; a pressurized supply of dust control solution to supply pressurized dust control solution to said nozzles for spraying into said second free falling stream of said particulate material; and, said transport vessel being located below and in line with said second stream to accumulate from said free falling second stream a mass of said proppant particulate material spray coated with said dust control solution while remaining free flowing.

2. A system as defined in claim 1 wherein said proppant is frac sand.

3. A system as defined in claim 1 wherein said coated particulate material has a moisture content of less than 0.3 percent so it remains free flowing.

4. A system as defined in claim 1 wherein said discharge device is a silo.

5. A system as defined in claim 1 wherein said discharge device is a transloader.

6. A system as defined in claim 5 wherein said transloader has an outlet structure and said drop-off edge of said deflector plate is not continuous and extends from a first point on said structure to a second point on said structure.

7. A system as defined in claim 1 wherein said drop-off edge is generally circular and said second free falling stream is generally in the shape of a cone.

8. A system as defined in claim 1 wherein said second stream width is less than 3 inches.

* * * * *